US009223003B2

(12) United States Patent
Segev

(10) Patent No.: US 9,223,003 B2
(45) Date of Patent: Dec. 29, 2015

(54) DIFFERENTIATED STATION LOCATION

(71) Applicant: Intel Corporation, Santa Clara, CA (US)

(72) Inventor: Jonathan Segev, Tel Mond (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/903,203

(22) Filed: May 28, 2013

(65) Prior Publication Data

US 2014/0171109 A1 Jun. 19, 2014

Related U.S. Application Data

(60) Provisional application No. 61/738,729, filed on Dec. 18, 2012, provisional application No. 61/751,442, filed on Jan. 11, 2013.

(51) Int. Cl.
*G01S 5/00* (2006.01)
*H04W 64/00* (2009.01)
*H04W 12/02* (2009.01)

(52) U.S. Cl.
CPC ............ *G01S 5/0045* (2013.01); *G01S 5/0027* (2013.01); *H04W 64/00* (2013.01); *H04W 12/02* (2013.01)

(58) Field of Classification Search
CPC ... G01S 5/0027; G01S 5/0036; G01S 5/0045; H04W 64/00; H04W 12/02; H04W 4/02; H04W 4/025

USPC .................. 701/517; 709/203, 209, 219, 225; 455/56.1, 41.2, 522, 420, 456.1–456.6, 455/410–411; 370/338, 252, 310
See application file for complete search history.

(56) References Cited

U.S. PATENT DOCUMENTS

| 7,751,825 | B2* | 7/2010 | Gogic ........................ 455/456.1 |
| 8,150,932 | B2* | 4/2012 | Waris ............................. 709/207 |
| 8,285,308 | B1* | 10/2012 | Wright et al. .............. 455/456.3 |
| 2004/0180669 | A1* | 9/2004 | Kall ........................... 455/456.1 |
| 2006/0123079 | A1* | 6/2006 | Sturniolo et al. ............. 709/203 |
| 2006/0277187 | A1* | 12/2006 | Roese et al. ...................... 707/9 |
| 2007/0121560 | A1* | 5/2007 | Edge ............................. 370/338 |
| 2009/0121927 | A1* | 5/2009 | Moshfeghi ............... 342/357.03 |
| 2010/0240398 | A1* | 9/2010 | Hotes et al. ................ 455/456.2 |
| 2012/0329384 | A1* | 12/2012 | Boldyrev et al. ............... 455/39 |
| 2013/0139193 | A1* | 5/2013 | Fan et al. ......................... 725/14 |

* cited by examiner

*Primary Examiner* — Brandon Miller
(74) *Attorney, Agent, or Firm* — Schwegman Lundberg & Woessner, P.A.

(57) ABSTRACT

Embodiments allow a station to determine its location and report the location to a access point or other network entity. The station obtains agreement with an access point, group of access points, or other network entity to provide its location to a designated accuracy level and the access point(s) agree to provide services such as access to a location service, the access point(s) location to a designated positional accuracy, etc. The station measures its position and induces an error in its reported location. The induced error prevents an exact location of the station from being determined by the access point(s) or others, thus preserving the privacy of the station. The location reported by the station may be absolute (e.g., geographic coordinates) or relative to a landmark, location, etc.

23 Claims, 8 Drawing Sheets

DIFFERENTIATED STATION LOCATION

PRIORITY CLAIM

This application claims priority under 35 USC 119(e) to U.S. Provisional Patent Application Ser. No. 61/738,729, filed Dec. 18, 2012, and to U.S. Provisional Patent Application Ser. No. 61/751,422, filed Jan. 11, 2013, both of which are incorporated herein by reference in their entirety.

TECHNICAL FIELD

Embodiments pertain to wireless communications. More particularly, some embodiments relate to determining the location of a station.

BACKGROUND

Determining station location is of growing interest in the wireless device area. However, there exists an interest in preserving privacy of a station so that the station location cannot be determined too closely.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

Figure 1:
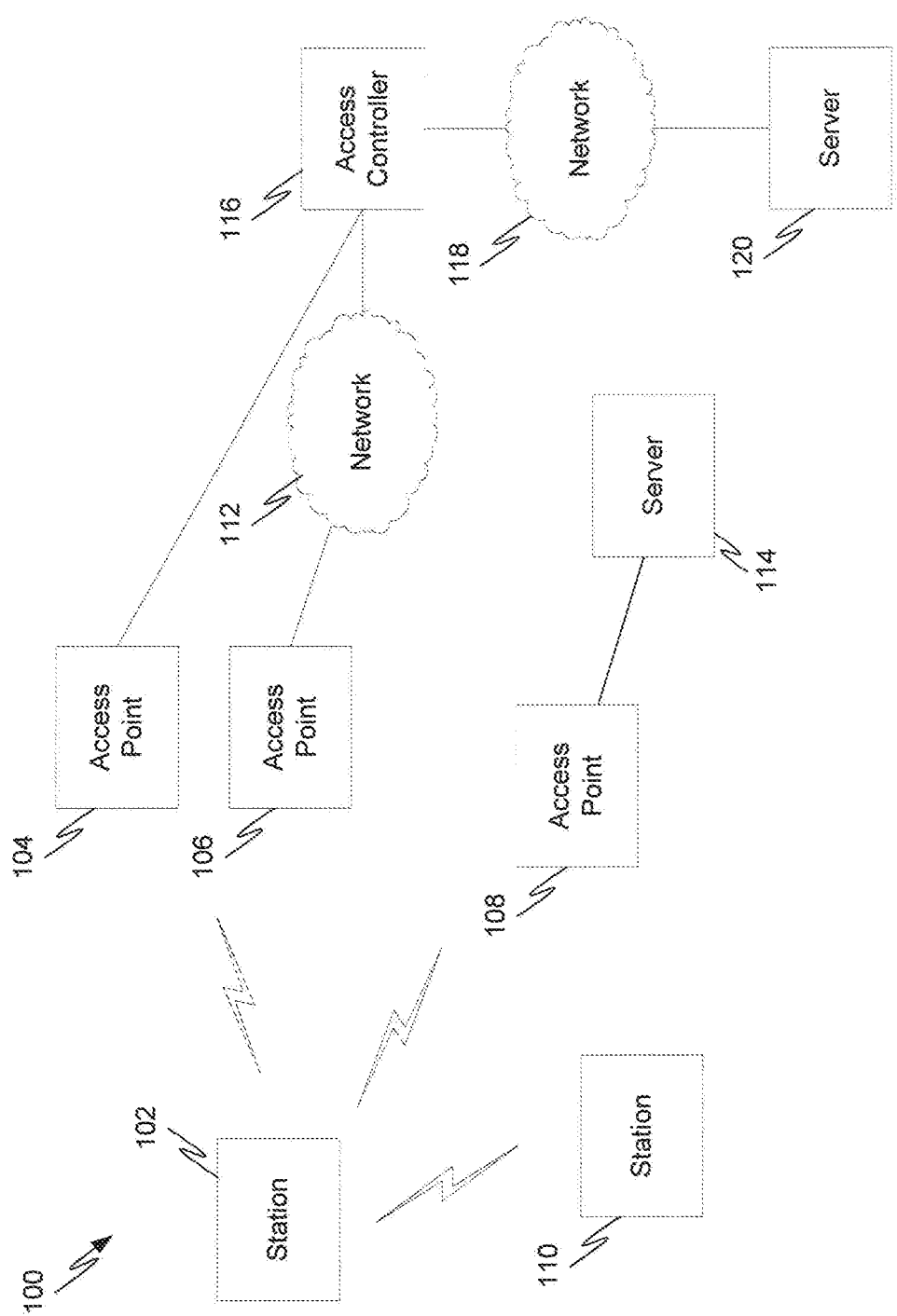
FIG. 1 illustrates an example wireless network where a station may calculate its position.

FIG. 1 illustrates an example wireless network, illustrated generally as 100. Network 100 may operate based on any of the 802.11 specifications, for example. The network may comprise a combination of stations (102, 110) and access points (104, 106, 108), which may connect a station to a larger network such as a Local Area Network (LAN), Wide Area Network (WAN), the internet, etc. In order to connect to a network a station, enters into a link connection protocol with an access point or other station.

In FIG. 1, for Example, Station 102 May Exchange Messages with access points 104, 106, 108, or station 110 to connect to a network. Access points may be connect to further networks or servers, either directly or indirectly, through access controllers, networks, etc. In FIG. 1, access point 108 connects to server 114, either directly or through a network (not shown). Access point 106 connects to server 120 through network 112, access controller 116 and network 120. Access point 104 connects to server 120 through access controller 116 and network 118. These are but representative examples of how a network may be connected.

As stations have become more mobile (e.g., mobile phones, tablets, laptop devices, etc.), there has been a growing interest in identifying device location. One mechanism to identify device location is by using time of flight to different access points. The network of FIG. 1 may also illustrate an example station calculating position based on time of flight or other message exchange. In FIG. 1, station 102 exchanges messages with multiple access points, e.g., 104, 106, 108 and/or station 110 to determine the round trip time of flight to each of the access points and/or statons. Since wireless messages propagate at the speed of light, there is a correlation between the time of flight and the distance to an access point. The distance to and location of multiple access points allows a station to triangulate its position using well-known algorithms.

Another mechanism that may be used to establish location is multilateration with hyperbolic navigation. In this mechanism, multiple transmitters (e.g., access points, stations) transmit messages and the time difference of arrival (or phase difference in some cases) of the messages at the receiver (e.g., station) is measured. In some embodiments, a transmitter transmits a signal at a known time after they receive a signal from another transmitter. In some embodiments, simultaneous transmission of signals may occur from multiple transmitters. If the location of the transmitters is known, and any fixed delay between the transmission of the signals is known, the location of the receiver may be determined. In general, three or more transmitters may be used.

In performing location calculations, access points may be connected to a common network entity such as server 114, access controller 116 and/or server 120 as shown in FIG. 1. Thus, in the embodiments described in this disclosure, where messages or other information is exchanged with an access point, any calculation, agreement, etc. may be performed by the access point itself, a network entity such as server 114, access controller 116 and/or server 120, or some combination thereof. In other words, although access points are generally used to illustrate the various mechanisms of this disclosure, network entities may also be substituted for access points or used in conjunction with access points.

On board instrumentation, such as accelerometers, gyro meters, barometers, magnetic sensors, GPS sensors, etc. may also allow a device to determine its location. Finally, other mechanisms such as Received Signal Strength Indication (RSSI) fingerprinting, IP geolocation, etc. may also be used. Such mechanisms may be used either alone, or in various combinations in conjunction with the disclosure herein. In the case of combinations of mechanisms used to determine location, not all of the mechanisms or measurements need be done at the same time. For example, perhaps a location is determined from using a WiFi location service. Thereafter, onboard sensors may be used to update the location as the device moves from the measured location.

A station's location may be used for a variety of purposes, both benign and not so benign, either by the station itself or by others. Thus, there exists privacy interest in ensuring that others cannot determine a station's location too accurately. In some embodiments of the disclosure, an error is induced in the device location to keep others from pinpointing the station location too closely.

Figure 2:
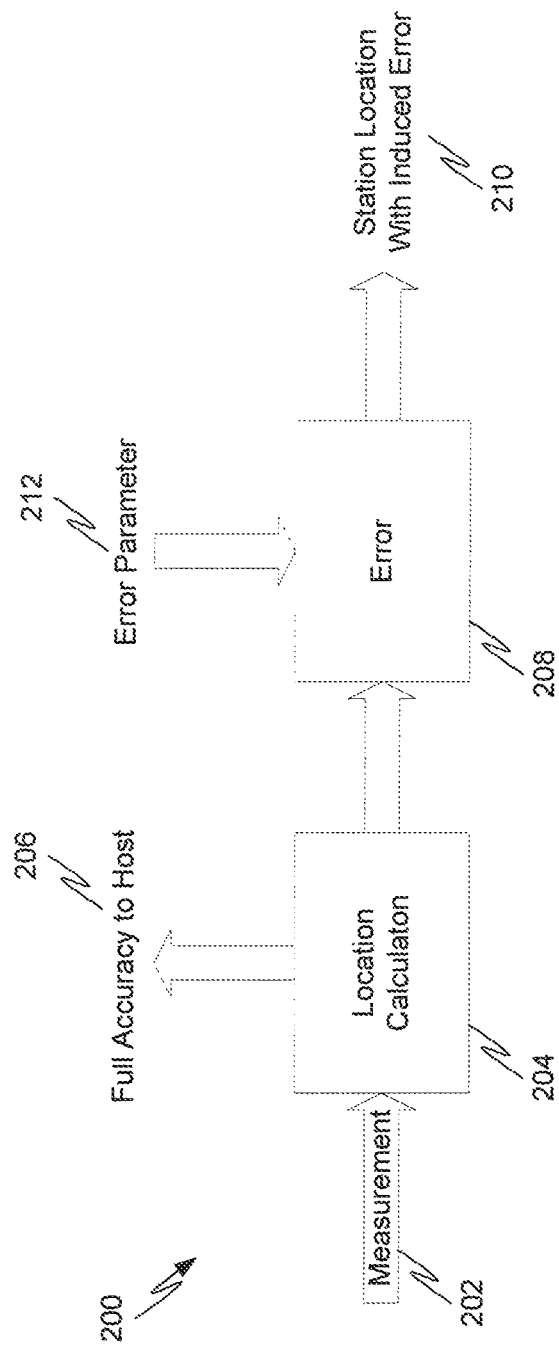
FIG. 2 illustrates induced error according to some embodiments.

FIG. 2 illustrates induced error according to some embodiments. The system of FIG. 2, illustrated generally as 200, identifies a stations true location and then induces an error to prevent others from pinpointing the station location too closely. In this process, measurements needed to determine station location are illustrated in FIG. 2 as measurements 202. Measurements 202 can be any required measurements that can be used to determine the station location to a desired level of accuracy. As discussed above, this can be time of flight measurements to an access point, multilateration, information received from on board sensors, location based on RSSI fingerprinting, location based on IP geolocation, etc. Combinations thereof may also be used.

Location calculation 204 illustrates using measurements 202 to determine station location to a level of accuracy. This full accuracy level is reported to the host as illustrated by 206. In example embodiments herein, a host may be a station, or other device.

Once a location is determined, an error may be induced in the location. Error block 208 of FIG. 2 illustrates this process. The error inducement may take various error parameters 212 as input to the process in some embodiments. These can be used in various schemes used to induce errors as discussed below.

A station or other device may then use this result to report its location to other entities, such as an access point, for example. This is illustrated in FIG. 2 by 210. For ease of discussion, the location of the station will be referred to as a "station location" or "device location" and the location after introducing an error will be referred to as a "reported location."

Location may be determined and reported in a variety of formats. For example some sort of absolute location may be used. Examples of absolute locations include systems that pinpoint a device location on the earth in a coordinate system such as latitude/longitude (i.e., World Geodetic System WGS84). Alternatively, a relative location may be used, which locates the system relative to some other location, usually by distance (e.g., metric, United States customary units, etc.). Absolute or relative locations may also be conceptual as opposed to distance based with location and/or "distances" being based on such things as landmark, street, building, floor, corridor, aisle, room, cubical, or other features.

Various mechanisms may be used to induce or inject errors into the station location to obtain the reported location. Some of these mechanisms may use inputs to induce errors. In FIG. 2, error parameter 212 represents these inputs, if any. In some embodiments, random values may be added to the station location to produce the reported location. However, when this mechanism is used, an entity receiving the reported location may be able to gain a better estimate through various filtering techniques to removed the added random "noise." In general, it can be difficult to design good random generators that do not succumb to such filtering or estimation techniques. In another embodiment, a random location within a geographic region may be reported. This random location may be absolute or conceptual. For example, if a station determines its location to be within a hotel, a random location within the hotel may be reported in order to separate the reported location from the locality of the randomness. In this type of embodiment, error parameter 212 may include a location or conceptual object within or about which the error should be induced. In our hotel example, error parameter 212 may be "hotel." In other embodiments, the reported location can be quantized to some level. For example, if a station is located in a particular hotel room of a particular hotel, the station may quantize the location and give the reported location as the hotel or as the street on which the hotel is located or the city within which the hotel is located. In this type of embodiment, error parameter 212 may be a quantization level such as structure (e.g., hotel), street, city, etc. If the quantization is performed using absolute as opposed to conceptual level, the quantization level may be an absolute dimension (meter, feet, etc.). Using such techniques, it can be difficult for an entity receiving the reported location to gain a more precise location of the station, depending on the level of quantization, whether the station is moving, how fast the station is moving, etc.

Figure 3:
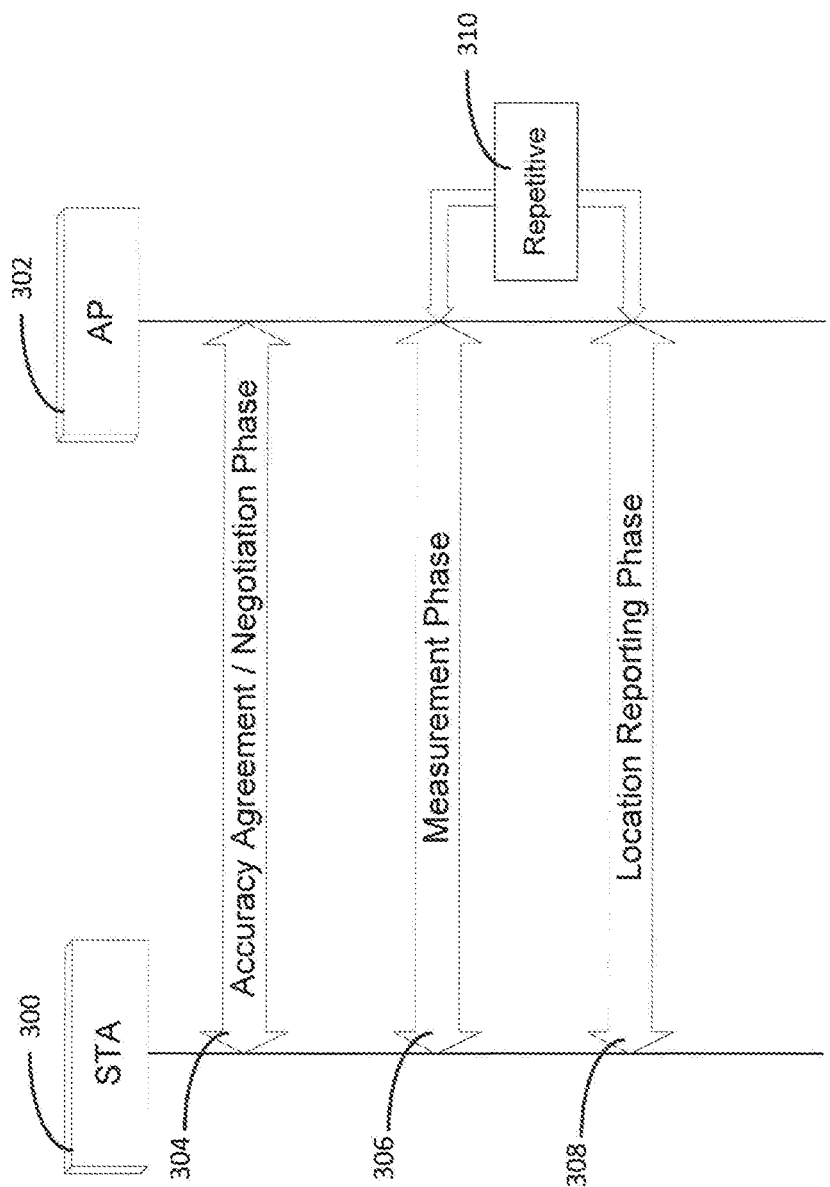
FIG. 3 illustrates location determination according to some embodiments.

FIG. 3 illustrates location determination according to some embodiments. The embodiment of FIG. 3 shows protocols between station 300 and access point 302 to determine the location of station 300 and to report that location to access point 302 (or to a network entity through access point 302, as discussed above). Although the embodiment of FIG. 3 uses a station and an access point to illustrate the embodiment, other devices such as two stations would also be possible.

The embodiment of FIG. 3 shows three phases where protocols are used to accomplish different tasks. In any or all of the phases and/or examples described below, multiple access points may be used for various phases or at various times, although only a single access point is illustrated. For example, part of accuracy/agreement phase 304 may be initiated with one access point and completed with another. As another example, accuracy agreement/negotiation phase 304 may be performed with multiple access points. In another example, accuracy agreement/negotiation phase 304 may be performed with one access point (or set of access points) and the other phases completed with a different access point (or set of access points). Alternatively, or additionally, access points may connect to other network entities such as access point controllers or various servers and these network entities may be participating in or performing the described phases through an access point or set of access points.

The process begins with accuracy agreement/negotiation phase 304. This phase may be performed once over multiple "rounds" of the other two phases. In other words, once an agreement has been reached in phase 304, the agreement may be valid for a period of time, until occurrence of a particular even, until revoked, etc. such that phases 306 and 308 may be repeated until the agreement is no longer valid. In some embodiments, the accuracy agreement/negotiation phase 304 may exist in different forms, or may not exist as a separate phase by itself. For example, station 300 may retrieve a policy from a designated location or as part of an initial link setup phase. In another example, station 300 may retrieve a policy from one access point or location and then complete the accuracy agreement/negotiation phase with a different access point. In still another example, agreement may come from initiating a measurement phase with an access point. In a further example, the agreement phase may be combined with the measurement phase in that the same message(s) used in the measurement phase may also establish the agreement. In still a further example, the agreement phase may be completed with one access point and the agreement is valid with multiple access points.

As discussed in greater detail below, location may be determined on a periodic basis, depending on the mobility of the station. Since accurate location determination typically requires interacting with multiple access points, such as when triangulation, trilateration or multilateration is used, phase 304 may be repeated with each individual access point, a set of access points, some backbone entity such as a location server or Authentication Authorization and Accounting (AAA) server and/or some combination thereof. In other words, in some embodiments, agreements are negotiated with each individual access point. In other embodiments, an agreement may cover multiple access points, or all access points of some common network entity. In other embodiments, some combination thereof may be used. Not all agreements reached with all entities in phase 304 need have the same form or yield the same accuracy.

Accuracy agreement/negotiation phase 304 may take different forms. In one embodiment, the access point may broadcast one or more location determination policies. In another embodiment of accuracy agreement/negotiation phase 304, the access point may provide its own, and possibly the infrastructure location determination policy using Access Network Query Protocol (ANQP). In yet another embodiment, a two-way negotiation may be used to determine the policy to be used. In still another embodiment, a combination of broadcast, multicast and/or two-way negotiation may be used to determine the policy to be used.

Each policy may contain the "terms" of the agreement including a positional accuracy level required/provided according the policy and the services that an access point or access points will provide in accordance with the policy, depending on whether the agreement is with a single access point or some network entity such as a location server or AAA server. The positional accuracy level may comprise a device positional accuracy level and/or an access point positional accuracy level. The device positional accuracy level is the positional accuracy level the device will be required to provide on its location as part of the agreement. The access point positional accuracy level is the positional accuracy the access point will provide on its location. A policy may specify the accuracy of the information the station will provide to allow the station to determine its location. A policy may provide some combination of motivations to the station to provide increasing levels of station positional accuracy such as increasing levels of service, decreasing costs, ability for the station to determine its location with greater accuracy, etc. The station may accept one of the location determination policies, along with any provided benefits, to gain access to the location determination service. In some embodiments, if the station chooses not to accept one of the policies, the access point may not allow access to the location determination service. In this latter situation, the access point may or may not grant access to the network, depending on the embodiment.

The station and/or access point may consider various parameters when determining what policy to accept (e.g., what station positional accuracy level and/or access point positional accuracy level to provide). Some possible parameters the station and/or access point may consider include the level of trust the station has toward the access point. If, for example, the access point provides authenticity credentials to the station and the station has a high degree of trust for the access point as a result, the station may be willing to agree to provide more accurate data to the access point. If, however, the station cannot authenticate the identity of the access point, the station may choose not to provide any location information. Similarly, if the channel provided is more secure, the station may be willing to provide more accurate information than if the channel is less secure in some fashion (e.g., more subject to hacking/spoofing, lower level of security, etc.). Parameters such as those identified above (e.g., cost of a service, prior contract with the service provider, level of service provided, etc.) may also be considered. The access point may also consider the same or similar factors when identifying what policies it should offer to the station.

The following describes some possible policies. These examples should not be considered to be limiting and are provided simply to help explain the types of items that may be included in a policy. For example, a policy may state that if the station is not willing to provide its location, the access point will only provide its location and other information sufficient to allow the station to determine its location within a 3-meter radius. If, however, the station is willing to provide its location within a 3-meter radius, the access point will provide information to allow the station to determine its location within a sub-one meter radius. In another example, the access point will provide location services free to a station if the station provides full accuracy information to the access point. Otherwise, if the station is willing to pay a fee for the location service, the station only need provide location information to a 10-meter radius. In still other embodiments other terms and/or conditions may be associated with the policy. For example, if a station agrees to provide its location to a building accuracy and agrees to allow advertising of a particular type/number/placement to be sent to the station while the station is located within a designated geographic area, then all access point associated with a given backbone entity will provide sufficient information to allow the station to determine its location within a sub-one meter radius for no cost. Otherwise, the station will be charged a set fee each time it exercise the location determination process. Rather than specific meter ranges, conceptual locations can be used such as street, building, block, city, etc. Any other combination of terms is also possible.

Measurement phase 306 allows station 300 to determine its location, in accordance with the agreement from phase 304. Station location may be determined from information provided by access point 302, by information obtained from on device sensors, or by information obtained elsewhere, or by some combination thereof. Furthermore, agreements from phase 304 may apply to station location determined in one (or more) manner but not in others, or may apply to station location determined in any fashion. As part of measurement phase 306, access point 302 may supply its location. The access point location supplied as part of this phase complies with the access point positional accuracy level agreed to in phase 304.

Location reporting phase 308 allows station 300 to send its reported location to access point 302. The access point may, in turn, send the reported location to another network entity, such as access controller or various servers connected to access point 302 or a shared set of access points that include access point 302. Additionally, or alternatively, station 300 may report its location through a different access point than the access point where the negotiation phase 304 took place. The reported location complies with the device positional accuracy level agreed to in phase 304.

As indicated by box 310, measurement phase 306 and location reporting phase 308 may be repeated periodically. As explained above, if the agreement between station 300 and access point 302 reached in phase 304 is still good, phase 304 need not be repeated even though measurement phase 306 and reporting phase 308 are repeated.

Although some dependencies may exist between the various phases, measurement phase 306 and/or location reporting phase 308 may take precedence of accuracy agreement/negotiation phase 304. For example, station may provide its reported location based on previous measurements and/or other measurement sources.

Figure 4:
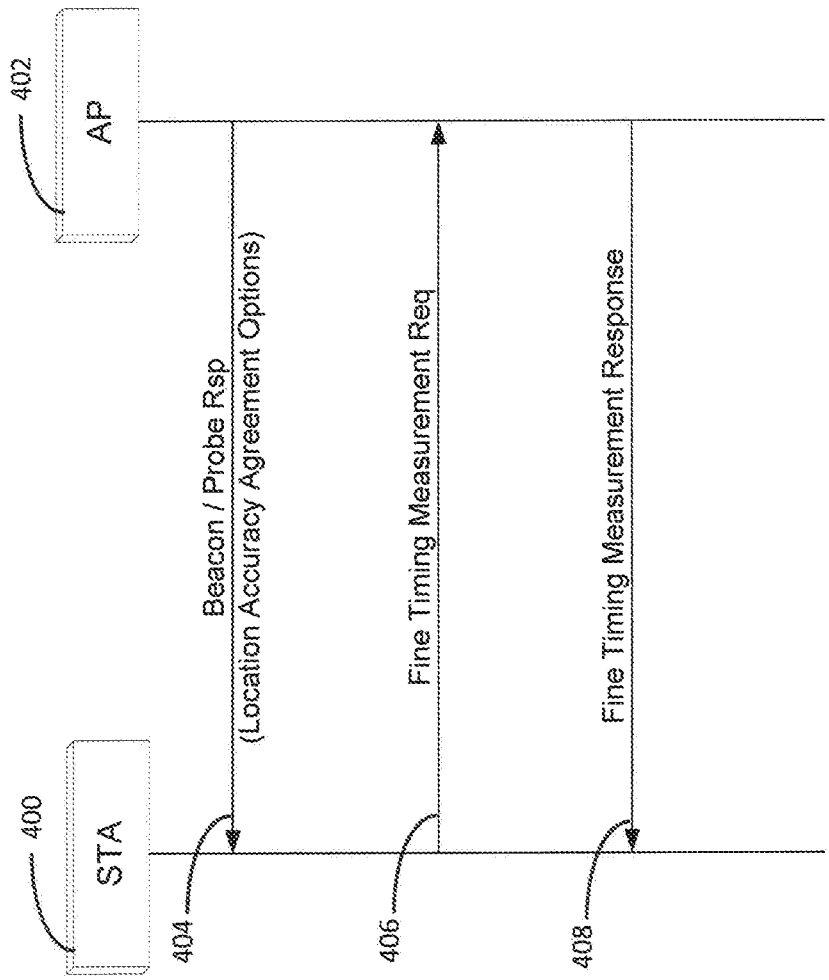
FIG. 4 illustrates accuracy agreement and negotiation according to some embodiments.

As explained above, accuracy agreement/negotiation phase 304 may take different forms and be implemented in different embodiments. Not all of the embodiments discussed above will be illustrated in figures, but all embodiments above form the basis of this disclosure. FIG. 4 illustrates accuracy agreement and negotiation according to some embodiments in simplified form. The embodiment of FIG. 4 does not include acknowledgment frames (e.g., ACK frames) and other reservation mechanisms like Reverse Direction (RD) mechanisms which may be used to make the frame exchange more efficient. These, however, may be implemented in conjunction with the embodiment disclosed in FIG. 4 by one of ordinary skill in the art.

In the embodiment of FIG. 4, access point 402 transmits to station 400 a beacon/probe response frame 404. This frame contains the location accuracy agreement options available to station 400. A beacon frame may be sent by an access point as part of a "passive" link establishment protocol. In such a protocol, access points periodically transmit a beacon message containing information that stations looking to join a network may use to initiate a link with the access point. A probe response frame may be sent by an access point as part of an "active" link establishment protocol. In such a protocol, stations looking to join a network transmit a probe request frame and access points that receive the request frame respond with a probe response frame. Thus beacon/probe response frame 404 illustrates that location accuracy agreement options may be transmitted as part of a access point discovery or link establishment protocol.

The location accuracy agreement options may be a location determination policy or multiple location determination policy options. Each policy may contain the "terms" of the agreement including a positional accuracy level required/provided according the policy and the services that access point will provide in accordance with the policy. The positional accuracy level may comprise a device positional accuracy level and/or an access point positional accuracy level. The device positional accuracy level is the positional accuracy level the device will be required to provide on its location as part of the agreement. The access point positional accuracy level is the positional accuracy the access point will provide on its location. A policy may specify the accuracy of the information the station will provide to allow the station to determine its location. A policy may provide some combination of motivations to the station to provide increasing levels of station positional accuracy such as increasing levels of service, decreasing costs, ability for the station to determine its location with greater accuracy, etc. The station may accept one of the location determination policies, along with any provided benefits, to gain access to the location determination service. In some embodiments, if the station chooses not to accept one of the policies, the access point may not allow access to the location determination service. In this latter situation, the access point may or may not grant access to the network, depending on the embodiment.

The station and/or access point may consider various parameters when determining what policy to accept (e.g., what station positional accuracy level and/or access point positional accuracy level to provide). Some possible parameters the station and/or access point may consider include the level of trust the station has toward the access point. If, for example, the access point provides authenticity credentials to the station and the station has a high degree of trust for the access point as a result, the station may be willing to agree to provide more accurate data to the access point. If, however, the station cannot authenticate the identity of the access point, the station may choose not to provide any location information. Similarly, if the channel provided is more secure, the station may be willing to provide more accurate information than if the channel is less secure in some fashion (e.g., more subject to hacking/spoofing, lower level of security, etc.). Parameters such as those identified above (e.g., cost of a service, prior contract with the service provider, level of service provided, etc.) may also be considered. The access point may also consider the same or similar factors when identifying what policies it should offer to the station.

The following describes some possible policies. These examples should not be considered to be limiting and are provided simply to help explain the types of items that may be included in a policy. For example, a policy may state that if the station is not willing to provide its location, the access point will only provide its location and other information sufficient to allow the station to determine its location within a 3-meter radius. If, however, the station is willing to provide its location within a 3-meter radius, the access point will provide information to allow the station to determine its location within a sub-one meter radius. In another example, the access point will provide location services free to a station if the station provides full accuracy information to the access point. Otherwise, if the station is willing to pay a fee for the location service, the station only need provide location information to a 10-meter radius. In still other embodiments other terms and/or conditions may be associated with the policy. For example, if a station agrees to provide its location to a building accuracy and agrees to allow advertising of a particular type/number/placement to be sent to the station while the station is located within a designated geographic area, then all access point associated with a given backbone entity will provide sufficient information to allow the station to determine its location within a sub-one meter radius for no cost. Otherwise, the station will be charged a set fee each time it exercise the location determination process. Rather than specific meter ranges, conceptual locations can be used such as street, building, block, city, etc. Any other combination of terms is also possible.

Once the station has decided which policies to accept, the station may send a frame to the access point, signaling acceptance of a policy. In the embodiment of FIG. 4, station 400 signals access point 402 of the policy by sending a fine timing measurement request frame 406. Such a request frame is generally sent as part of a procedure that allows a station to determine its clock skew relative to the clock of the access point. The frame, however, may also be used to signal acceptance of a policy.

Access point 402 may signal acknowledgment of the acceptance by sending fine timing measurement response frame 408.

Figure 5:
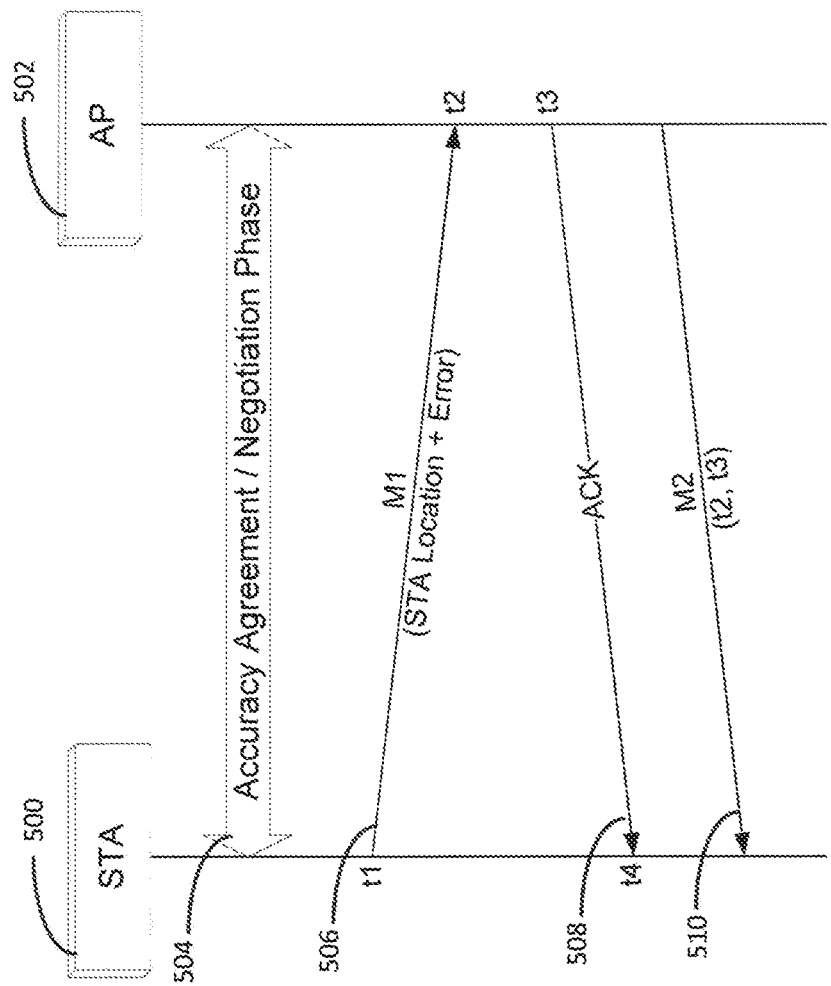
FIG. 5 illustrates location determination according to some embodiments.

FIG. 5 illustrates location determination according to some embodiments. The embodiment shows protocols between station 500 and access point 502 to first agree on a policy and then determine the location of station 500 and report that location to access point 502. In FIG. 5, accuracy agreement/negotiation phase 504 may be an accuracy agreement/negotiation phase such as those described in conjunction with FIG.

3 and FIG. 4. The purpose of phase 504 is to allow station 500 and access point 502 to agree on a location determination policy.

As described above, the location determination policy may contain the "terms" of the agreement including a positional accuracy level required/provided according the policy and the services that access point will provide in accordance with the policy. The positional accuracy level may comprise a device positional accuracy level and/or an access point positional accuracy level. The device positional accuracy level is the positional accuracy level the device will be required to provide on its location as part of the agreement. The access point positional accuracy level is the positional accuracy the access point will provide on its location. A policy may specify the accuracy of the information the station will provide to allow the station to determine its location. A policy may provide some combination of motivations to the station to provide increasing levels of station positional accuracy such as increasing levels of service, decreasing costs, ability for the station to determine its location with greater accuracy, etc. The station may accept one of the location determination policies, along with any provided benefits, to gain access to the location determination service. In some embodiments, if the station chooses not to accept one of the policies, the access point may not allow access to the location determination service. In this latter situation, the access point may or may not grant access to the network, depending on the embodiment The station and/or access point may consider various parameters when determining what policy to accept (e.g., what station positional accuracy level and/or access point positional accuracy level to provide). Some possible parameters the station and/or access point may consider include the level of trust the station has toward the access point. If, for example, the access point provides authenticity credentials to the station and the station has a high degree of trust for the access point as a result, the station may be willing to agree to provide more accurate data to the access point. If, however, the station cannot authenticate the identity of the access point, the station may choose not to provide any location information. Similarly, if the channel provided is more secure, the station may be willing to provide more accurate information than if the channel is less secure in some fashion (e.g., more subject to hacking/spoofing, lower level of security, etc.). Parameters such as those identified above (e.g., cost of a service, prior contract with the service provider, level of service provided, etc.) may also be considered. The access point may also consider the same or similar factors when identifying what policies it should offer to the station.

The following describes some possible policies. These examples should not be considered to be limiting and are provided simply to help explain the types of items that may be included in a policy. For example, a policy may state that if the station is not willing to provide its location, the access point will only provide its location and other information sufficient to allow the station to determine its location within a 3-meter radius. If, however, the station is willing to provide its location within a 3-meter radius, the access point will provide information to allow the station to determine its location within a sub-one meter radius. In another example, the access point will provide location services free to a station if the station provides full accuracy information to the access point. Otherwise, if the station is willing to pay a fee for the location service, the station only need provide location information to a 10-meter radius. In still other embodiments other terms and/or conditions may be associated with the policy. For example, if a station agrees to provide its location to a building accuracy and agrees to allow advertising of a particular type/number/placement to be sent to the station while the station is located within a designated geographic area, then all access point associated with a given backbone entity will provide sufficient information to allow the station to determine its location within a sub-one meter radius for no cost. Otherwise, the station will be charged a set fee each time it exercise the location determination process. Rather than specific meter ranges, conceptual locations can be used such as street, building, block, city, etc. Any other combination of terms is also possible.

After the station and access point agree on a location determination policy, the station may fulfill its agreement by providing its reported station location (e.g., station location with an induced error) to the access point as indicated by message frame M1 506. This may occur, for example, if the station knows its location to sufficient accuracy to meet the agreement, for example from on board sensors, prior calculation, etc. In this case, it need not wait to report its location to the access point. This may have the effect of "flipping" the order of the phases shown in FIG. 3, for example. In the embodiment of FIG. 5, station 500 tracks the transmission time of message frame 506. This is labeled t1 in FIG. 5.

Access point 502 receives message frame 506 and notes the receipt time (labeled t2 in FIG. 5). Access point then transmits acknowledgement frame 508 to station 500 and notes the transmission time (labeled t3 in FIG. 5). Access point 502 then transmits message frame M2 510 as illustrated in FIG. 5. Message frame 502 may comprise the receipt time of message frame 506 (t2) and the transmit time of message frame 508 (t3).

When station 500 receives message frame 506, it has all the information it needs to calculate the time of flight between the station 500 and access point 502 (e.g., (t4−t1)−(t3−t2)). With the time of flight and the location of access point 502, station 500 can calculate its relative position from access point 502. Access point 502 may provide its location in compliance with location determination policy in an number of ways, including placing it within one of the frames illustrated in FIG. 5, or by sending it as part of the accuracy agreement/negotiation phase 504.

The accuracy of the information provided by access point 502 to station 500 as part of the exchange illustrated in FIG. 5 may be governed by the location determination policy. Thus, t2, t3, and/or the location of access point 502, may contain some induced error compliant with the location determination policy.

Figure 6:
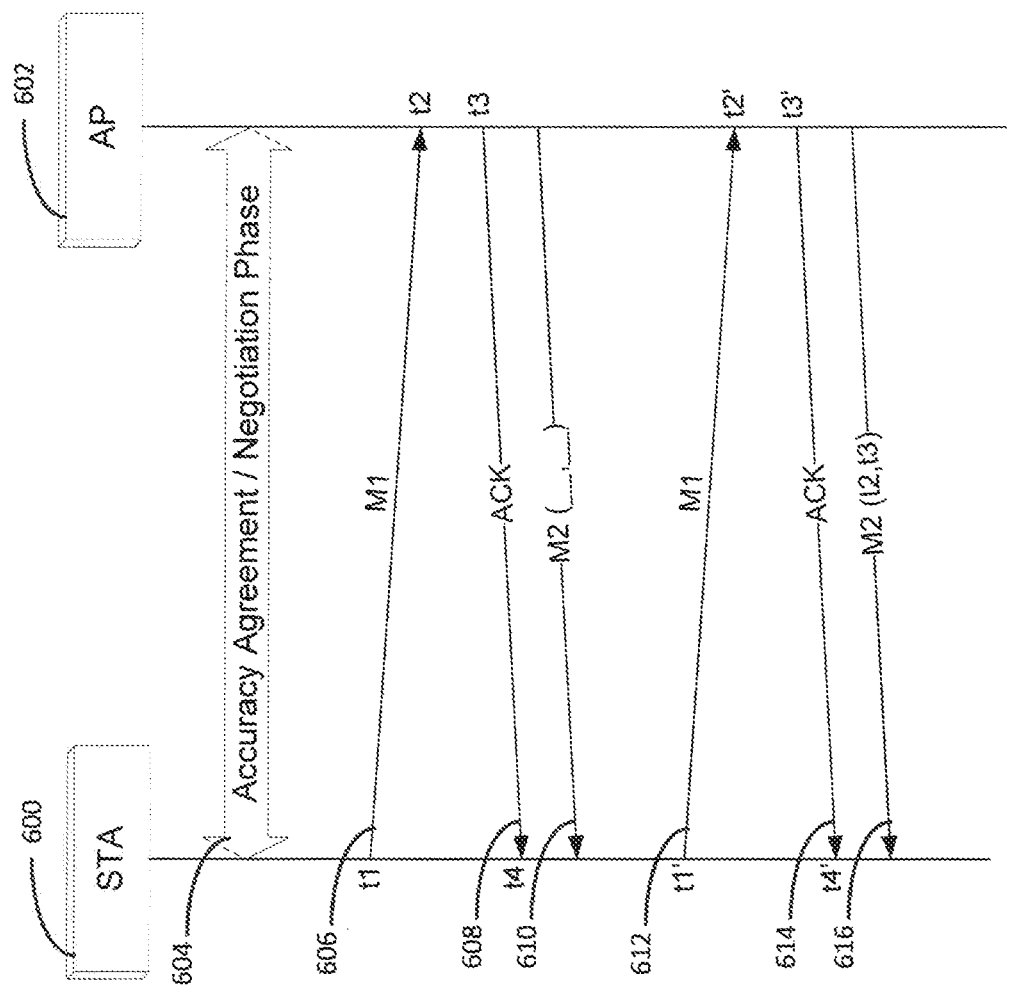
FIG. 6 illustrates location determination according to some embodiments.

FIG. 6 illustrates location determination according to some embodiments. The embodiment of FIG. 6 may use messages as part of the RD set of message frames to determine station location. The embodiment shows protocols between station 600 and access point 602 to first agree on a policy and then determine the location of station 600 and report that location to access point 602. In FIG. 6, accuracy agreement/negotiation phase 604 may be an accuracy agreement/negotiation phase such as those described in conjunction with FIG. 3 and FIG. 4. The purpose of phase 604 is to allow station 600 and access point 602 to agree on a location determination policy. As the details of such accuracy agreement/negotiation phase have been covered previously, they will not be repeated here. At the end of accuracy agreement/negotiation phase 604, terms of the agreement, including a positional accuracy level required/provided according the policy and the services that access point will provide in accordance with the policy will have been established.

After the station 600 and access point 602 agree on a location determination policy, station 600 may initiate the measurement phase by transmitting message frame M1 606 to access point 602. As discussed in conjunction with FIG. 5, if station 600 has a reported location sufficient to fulfill its agreement, it may provide the reported location as part of message frame M1 606. Station 600 notes the transmission time of message frame M1 606, labeled t1 in FIG. 6.

Access point 602 receives message frame 606 and notes the receipt time (labeled t2 in FIG. 6). Access point then transmits acknowledgement frame 608 to station 600 and notes the transmission time (labeled t3 in FIG. 6). Access point 602 then transmits message frame M2 610 as illustrated in FIG. 6. In the embodiment of FIG. 6, the time delay at access point 602 between receipt of message frame 606 and transmission of acknowledgement frame 608 and the time delay between transmission of acknowledgement frame 608 and transmission of message frame 610 may be a Short Interframe Space (SIFS). This is about 10 microseconds or about 16 microseconds, depending on the version of the 802.11 standard being referenced. Since a SIFS time interval is so short, there will not likely be time to identify t2 and t3 and place them in message frame 610. Thus, message frame 610 may not include time t2 and time t3.

After some delay, station 600 may initiate another round of message exchanges. Again, an M1 message frame is sent from station 600 to access point 602. This is labeled 612 in FIG. 6. Message frame 612 is transmitted at time t1' and received at access point 602 time t2'. Access point 602 transmits acknowledgement frame 614 (labeled t3' in FIG. 6) and then transmits message frame M2, labeled 616 in FIG. 6, and includes times the receipt time of message frame 606 (time t2) and the transmit time of acknowledgement frame 608 (time t3) as indicated. As before, the time delay between receipt of message frame 612 and transmission of acknowledgement frame 614 may be a SIFS. Similarly, the time delay between transmission of acknowledgement frame 614 and message frame 616 may be a SIFS.

As indicated by this discussion, the time of receipt and time of transmission of the prior round of messages is transmitted in the current round of messages.

When station 600 receives message frame 616, it has all the information it needs to calculate the time of flight between the station 600 and access point 602 (e.g., (t4–t1)–(t3–t2)). With the time of flight and the location of access point 602, station 600 can calculate its relative position from access point 602. Access point 602 may provide its location in compliance with location determination policy in an number of ways, including placing it within one of the frames illustrated in FIG. 6, or by sending it as part of the accuracy agreement/negotiation phase 604.

Although not shown in FIG. 6, a variation of this message exchange may be used which combines the separate acknowledgment frame and M2 message frame into a single message frame.

The accuracy of the information provided by access point 602 to station 600 as part of the exchange illustrated in FIG. 6 may be governed by the location determination policy. Thus, t2, t3, and/or the location of access point 602, may all contain some induced error compliant with the location determination policy.

Figure 7:
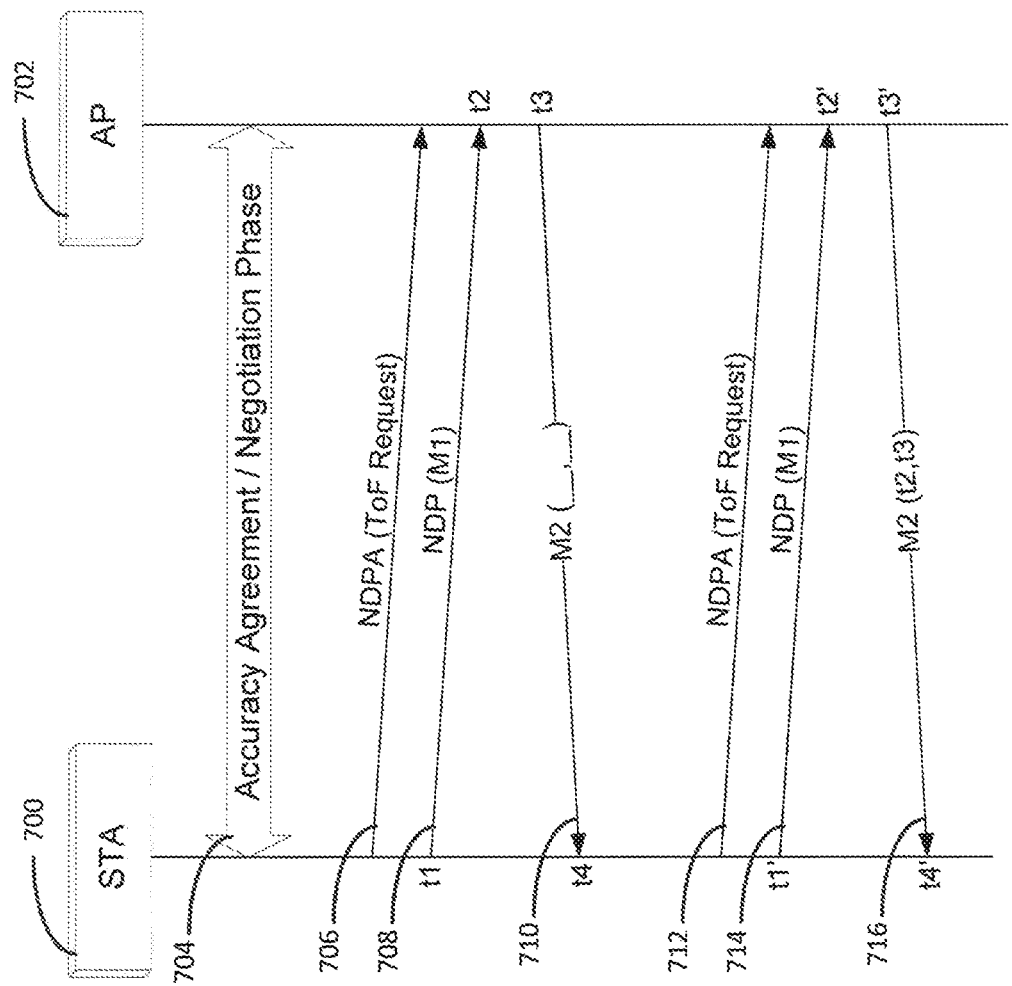
FIG. 7 illustrates location determination according to some embodiments.

FIG. 7 illustrates location determination according to some embodiments. The embodiment of FIG. 7 may use the Null Data Packet (NDP) set of message frames to measure location of the station. The embodiment shows protocols between station 700 and access point 702 to first agree on a policy and then determine the location of station 700 and report that location to access point 702. In FIG. 7, accuracy agreement/ negotiation phase 704 may be an accuracy agreement/negotiation phase such as those described in conjunction with FIG. 3 and FIG. 4. The purpose of phase 704 is to allow station 700 and access point 702 to agree on a location determination policy. As the details of such accuracy agreement/negotiation phase have been covered previously, they will not be repeated here. At the end of accuracy agreement/negotiation phase 704, terms of the agreement, including a positional accuracy level required/provided according the policy and the services that access point will provide in accordance with the policy will have been established.

After the station 700 and access point 702 agree on a location determination policy, station 700 may initiate the measurement phase by transmitting Null Data Packet Announcement (NDPA) message frame 706 to access point 702. In this case the NDPA message frame 706 will indicate to access point 702 that station 700 is requesting time of flight measurements.

Station 700 then transmits NDP message frame 708 and notes the transmission time, t1. As indicated in FIG. 7, NDP message frame 708 may include the information of M1 message frame. As discussed in conjunction with FIG. 5, if station 700 has a reported location sufficient to fulfill its agreement, it may provide the reported location as part of NDP message frame 708.

Access point 702 receives NDP message frame 708 and notes the receipt time (labeled t2 in FIG. 7). Access point then transmits message frame M2, labeled 710, to station 700 and notes the transmission time (labeled t3 in FIG. 7). In the embodiment of FIG. 7, the time delay at access point 702 between receipt of message frame 708 and transmission of message frame 610 may be a SIFS. Since a SIFS time interval is so short, there will not likely be time to identify t2 and t3 and place them in message frame 610. Thus, message frame 610 may not include time t2 and time t3.

After some delay, station 700 may initiate another round of message exchanges. Again, an NDPA message frame is sent from station 700 to access point 702. This is labeled 712 in FIG. 7. Station 700 then sends NDP message frame 714 at time t1' and access point 702 receives message frame 714 at time t2'. Access point 702 transmits message frame M2, labeled 716 in FIG. 7 at time t3', and includes times the receipt time of message frame 708 (time t2) and the transmit time of message frame 710 (time t3) as indicated. As before, the time delay between receipt of message frame 714 and transmission of message frame 716 may be a SIFS.

As indicated by this discussion, the time of receipt and time of transmission of the prior round of messages is transmitted in the current round of messages.

When station 700 receives message frame 716, it has all the information it needs to calculate the time of flight between the station 700 and access point 702 (e.g. (t4–t1)–(t3–t2)). With the time of flight and the location of access point 702, station 700 can calculate its relative position from access point 702. Access point 702 may provide its location in compliance with location determination policy in an number of ways, including placing it within one of the frames illustrated in FIG. 7, or by sending it as part of the accuracy agreement/negotiation phase 704.

Although not shown in FIG. 7, a variation of this message exchange may be used. This variant includes times t3 and t2 within the same round (e.g., time t2 and t3 would be sent as part of message frame 710). In this embodiment, message frame 710 (as well as subsequent M2 message frames such as 716) may also include channel estimation information.

The accuracy of the information provided by access point 702 to station 700 as part of the exchange illustrated in FIG. 7 may be governed by the location determination policy.

Thus, t2, t3, and/or the location of access point 702, may all contain some induced error compliant with the location determination policy.

Figure 8:
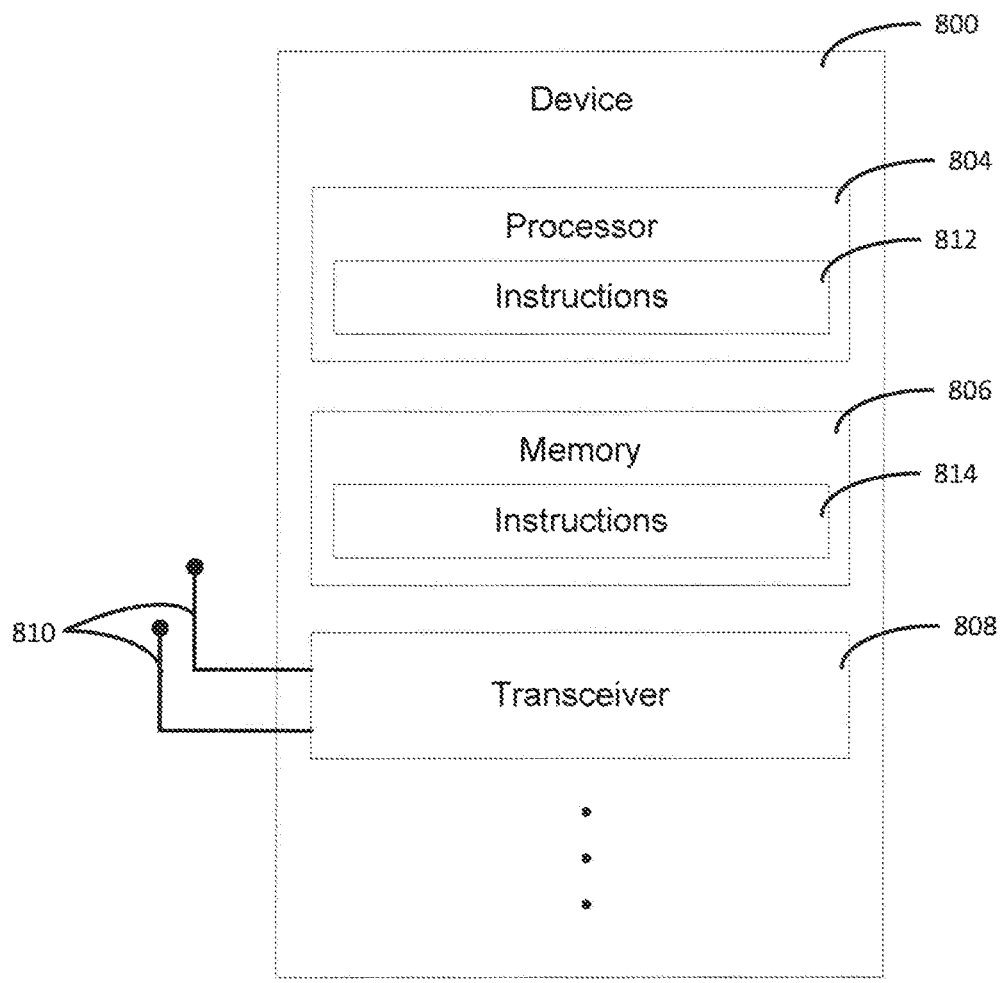
FIG. 8 illustrates a system block diagram according to some embodiments.

FIG. 8 illustrates an example system block diagrams according to some embodiments. FIG. 8 illustrates a block diagram of a device 800. Such a device could be, for example, a station such as station 102, 110, 300, 400, 500, 600 or 700. Such a device could also be, for example, an access point, such as access point 104, 106, 108, 302, 402, 502, 602 or 702), an access point controller, server and/or other network entity.

Device 800 may include processor 804, memory 806, transceiver 808, antennas 810, instructions 812, 814, and possibly other components (not shown).

Processor 804 comprises one or more central processing units (CPUs), graphics processing units (GPUs), accelerated processing units (APUs), or various combinations thereof. The processor 804 provides processing and control functionalities for device 800.

Memory 808 comprises one or more transient and/or static memory units configured to store instructions and data for device 800. Transceiver 808 comprises one or more transceivers including, for an appropriate station or responder, a multiple-input and multiple-output (MIMO) antenna to support MIMO communications. For device 800, transceiver 812 receives transmissions and transmits transmissions. Transceiver 812 may be coupled to antennas 810, which represent an antenna or multiple antennas, as appropriate to the device.

The instructions 812, 814 comprise one or more sets of instructions or software executed on a computing device (or machine) to cause such computing device (or machine) to perform any of the methodologies discussed herein. The instructions 812, 814 (also referred to as computer- or machine-executable instructions) may reside, completely or at least partially, within processor 804 and/or the memory 806 during execution thereof by device 800. While instructions 812 and 814 are illustrated as separate, they can be part of the same whole. The processor 804 and memory 806 also comprise machine-readable media.

In FIG. 8, processing and control functionalities are illustrated as being provided by processor 804 along with associated instructions 804 and 806. However, these are only examples of processing circuitry that comprise programmable logic or circuitry (e.g., as encompassed within a general-purpose processor or other programmable processor) that is temporarily configured by software or firmware to perform certain operations. In various embodiments, processing circuitry may comprise dedicated circuitry or logic that is permanently configured (e.g., within a special-purpose processor, application specific integrated circuit (ASIC), or array) to perform certain operations. It will be appreciated that a decision to implement a processing circuitry mechanically, in dedicated and permanently configured circuitry, or in temporarily configured circuitry (e.g., configured by software) may be driven by, for example, cost, time, energy-usage, package size, or other considerations.

Accordingly, the term "processing circuitry" should be understood to encompass a tangible entity, be that an entity that is physically constructed, permanently configured (e.g., hardwired), or temporarily configured (e.g., programmed) to operate in a certain manner or to perform certain operations described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The term "computer readable medium," "machine-readable medium" and the like should be taken to include a single medium or multiple media (e.g., a centralized or distributed database, and/or associated caches and servers) that store the one or more sets of instructions. The terms shall also be taken to include any medium that is capable of storing, encoding or carrying a set of instructions for execution by the machine and that cause the machine to perform any one or more of the methodologies of the present disclosure. The term "computer readable medium," "machine-readable medium" shall accordingly be taken to include both "computer storage medium," "machine storage medium" and the like (tangible sources including, solid-state memories, optical and magnetic media, or other tangible devices and carriers but excluding signals per se, carrier waves and other intangible sources) and "computer communication medium." "machine communication medium" and the like (intangible sources including, signals per se, carrier wave signals and the like).

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The following represent various example embodiments.

EXAMPLE 1

A device comprising:
processing circuitry configured to:
initiate an agreement protocol to identify a positional accuracy;
initiate a measurement protocol to identify a reported device location, the reported device location comprising a location of the device with an induced error;
initiate a reporting protocol to transmit the reported device location to a second device.

EXAMPLE 2

The device of example 1 wherein the agreement protocol occurs between the device and an access point and where the positional accuracy comprises a device positional accuracy and an access point positional accuracy.

EXAMPLE 3

The device of any preceding example wherein the agreement protocol occurs between a plurality of access points, and wherein the agreement protocol identifies a device positional accuracy, and an access positional accuracy for each of the plurality of access points.

EXAMPLE 4

The device of any preceding example wherein the measurement protocol comprises an exchange of messages with an access point to determine time of flight to the access point.

EXAMPLE 5

The device of any preceding example wherein the positional accuracy is selected from the group comprising an absolute positional accuracy and a relative positional accuracy.

EXAMPLE 6

The device of any preceding example wherein the reported device location is a conceptual location and wherein the reported device location complies with the positional accuracy.

EXAMPLE 7

The device of any preceding example wherein the reporting protocol comprises transmitting, to a second device, the reported device location, the reported device location complying with the device positional accuracy.

EXAMPLE 8

A method to comprising:
identifying, by a device having a device location, a positional accuracy level;
exchanging a sequence of messages with a second device to determine the device location
deriving a reported device location, the reported device location comprising the device location with an induced error, the reported device location complying with the positional accuracy level; and
sending to the second device the reported device location.

EXAMPLE 9

The method of example 8 wherein identifying the positional accuracy level comprises exchanging messages with the second device to negotiate the positional accuracy level.

EXAMPLE 10

The method of example 8 or 9 wherein the second device is an access point and wherein the positional accuracy level comprises a device positional accuracy level and an access point positional accuracy level.

EXAMPLE 11

The method of example 10 wherein identifying the positional accuracy level comprises retrieving a location of the access point location, the location of the access point complying with the access point positional accuracy level.

EXAMPLE 12

The method of example 10 or 11 wherein identifying the positional accuracy level comprises exchanging messages with a second access point to negotiate a second positional accuracy level.

EXAMPLE 13

The method of example 10, 11 or 12 wherein the positional accuracy level applies to the access point and to other access points.

EXAMPLE 14

The method of example 8 or 9 wherein the positional accuracy level is based on an agreement between the device and the second device.

EXAMPLE 15

A computer storage medium having executable instructions embodied thereon that, when executed, configure a device to:
initiate an agreement protocol with an access point, the agreement protocol to identify a location determination policy, the location determination policy comprising a device positional accuracy level;
initiate a measurement protocol comprising determining, by the device the device location; and
initiate a reporting protocol comprising sending, by the device to the access point, a reported device location, the reported device location comprising the device location with an induced error, the reported device location complying with the device positional accuracy level.

EXAMPLE 16

The computer storage medium of example 15 wherein the location determination policy further comprises an access point positional accuracy level and wherein the access point positional accuracy level applies to the access point and to other access points.

EXAMPLE 17

The computer storage medium of example 15 or 16 wherein the location determination policy further comprises an access point positional accuracy level and wherein the device positional accuracy level is dependent on the trust level of the device to the access point.

EXAMPLE 18

The computer storage medium of example 15, 16, or 17 wherein the location determination policy further comprises an access point positional accuracy level and wherein the access point positional accuracy level is dependent on at least one of:
an agreement by the device to allow advertising to be placed on the device;
the device positional accuracy level;
a cost of service provided by the access point to the device;

a level of service provided by the access point to the device; and a trust level of the access point to the device.

EXAMPLE 19

The computer storage medium of example 15, 16, 17 or 18 wherein the access point positional accuracy level is dependent on multiple factors.

EXAMPLE 20

The computer storage medium of example 15, 16, 17, 18, or 19 wherein the location determination policy further comprises an access point positional accuracy level and wherein the measurement protocol further comprises a sequence of messages allowing the device to determine a time of flight from the device to the access point and a reported access point location, the reported access point location complying with the access point positional accuracy level.

EXAMPLE 21

The computer storage medium of example 15, 16, 17, 18, 19 or 20 wherein the measurement protocol further comprises determining, by the device, the device location using data acquired from the group comprising Received Signal Strength Indicator readings, Global Positioning System readings, and on device sensors.

EXAMPLE 22

The computer storage medium of example 21 wherein the device location is determined from a combination of data acquired from the group and the access point.

EXAMPLE 23

The computer storage medium of example 15, 16, 17, 18, 19, 20, 21 or 22 wherein the reported device location is given in a format selected from the group comprising absolute location, relative location, absolute conceptual location, and relative conceptual location.

EXAMPLE 24

The computer storage medium of example 15, 16, 17, 18, 19, 20, 21, 22, 23, or 24 wherein the reported device location is quantized.

EXAMPLE 25

A device comprising:
processing circuitry configured to:
identify a location determination policy comprising a positional accuracy, the positional accuracy level based upon one or more of:
an agreement by the device to allow advertising to be placed on the device;
a cost of service provided by an access point to the device;
a level of service provided by the access point to the device;
a trust level of the access point to the device; and
a trust level of the device to the access point;
determine, a device location for the device; and
send, to the access point, a reported device location, the reported device location comprising the device location with an induced error, the reported device location complying with the positional accuracy level.

What is claimed is:

1. A wireless device comprising: transceiver circuitry to transmit and receive messages as part of at least one protocol; memory; a processor coupled to the memory and transceiver circuitry; and instructions, stored in the memory, which when executed cause the processor to: initiate an agreement protocol with an access point to identify a positional accuracy; initiate a measurement protocol to identify an actual device location; deriving a reported device location comprising the actual device location with an induced error; the reported device location complying with the positional accuracy; and initiate a reporting protocol to transmit the reported device location to the access point without transmitting the actual device location.

2. The device of claim 1 wherein the agreement protocol occurs between the device and the access point and where the positional accuracy comprises a device positional accuracy and an access point positional accuracy.

3. The device of claim 1 wherein the reporting protocol comprises transmitting, to a second device, the reported device location.

4. The device of claim 1 wherein the access point is part of a plurality of access points and the agreement protocol occurs between the wireless device and the plurality of access points, and wherein the agreement protocol identifies a device positional accuracy, and an access positional accuracy for each of the plurality of access points.

5. The device of claim 1 wherein the measurement protocol comprises an exchange of messages with the access point to determine time of flight to the access point.

6. The device of claim 1 wherein the positional accuracy is selected from the group comprising an absolute positional accuracy and a relative positional accuracy.

7. The device of claim 1 wherein the reported device location is a conceptual location.

8. A method comprising: identifying, by a device having an actual device location, a positional accuracy level through an exchange of messages with an access point; exchanging a sequence of messages with the access point to determine the actual device location; deriving a reported device location, the reported device location comprising the actual device location with an induced error, the reported device location complying with the positional accuracy level; and sending to the access point the reported device location without sending the actual device location.

9. The method of claim 8 wherein the positional accuracy level is based on an agreement between the device and the access point.

10. The method of claim 8 wherein the positional accuracy level comprises a device positional accuracy level and an access point positional accuracy level.

11. The method of claim 10 wherein identifying the positional accuracy level comprises retrieving a location of the access point location, the location of the access point complying with the access point positional accuracy level.

12. The method of claim 10 wherein identifying the positional accuracy level comprises exchanging messages with a second access point to negotiate a second positional accuracy level.

13. The method of claim 10 wherein the positional accuracy level applies to the access point and to other access points.

14. A computer storage medium having executable instructions embodied thereon that, when executed, configure a device to:

initiate an agreement protocol with an access point to identify a location determination policy, the location determination policy comprising a device positional accuracy level;

initiate a measurement protocol comprising determining, by the device an actual device location;

derive a reported device location comprising the actual device location with an induced error, the reported device location complying with the device positional accuracy level; and initiate a reporting protocol comprising sending, by the device to the access point, the reported device location without revealing to the access point the actual device location.

15. The computer storage medium of claim 14 wherein the location determination policy further comprises an access point positional accuracy level and wherein the access point positional accuracy level applies to the access point and to other access points.

16. The computer storage medium of claim 14 wherein the location determination policy further comprises an access point positional accuracy level and wherein the device positional accuracy level is dependent on the trust level of the device to the access point.

17. The computer storage medium of claim 14 wherein the location determination policy further comprises an access point positional accuracy level and wherein the access point positional accuracy level is dependent on at least one of:
an agreement by the device to allow advertising to be placed on the device;
the device positional accuracy level;
a cost of service provided by the access point to the device;
a level of service provided by the access point to the device; and
a trust level of the access point to the device.

18. The computer storage medium of claim 14 wherein the location determination policy further comprises an access point positional accuracy level and wherein the measurement protocol further comprises a sequence of messages allowing the device to determine a time of flight from the device to the access point and a reported access point location, the reported access point location complying with the access point positional accuracy level.

19. The computer storage medium of claim 14 wherein the measurement protocol further comprises determining, by the device, the actual device location using data acquired from the group comprising Received Signal Strength Indicator readings, Global Positioning System readings, and on device sensors.

20. The computer storage medium of claim 19 wherein the actual device location is determined from a combination of data acquired from the group and the access point.

21. The computer storage medium of claim 14 wherein the reported device location is given in a format selected from the group comprising absolute location, relative location, absolute conceptual location, and relative conceptual location.

22. A device comprising:
processing circuitry configured to:
identify a location determination policy comprising a positional accuracy, the positional accuracy level based upon one or more of:
an agreement by the device to allow advertising to be placed on the device;
a cost of service provided by an access point to the device;
a level of service provided by the access point to the device;
a trust level of the access point to the device; and
a trust level of the device to the access point;
determine an actual device location for the device;
send, to the access point, a reported device location without revealing the actual device location to the access point, the reported device location comprising the actual device location with an induced error, the reported device location complying with the positional accuracy level.

23. The device of claim 22 wherein the reported device location is quantized.

* * * * *